(12) United States Patent
Bi et al.

(10) Patent No.: US 12,483,491 B1
(45) Date of Patent: Nov. 25, 2025

(54) RECORDING NETWORK INFORMATION FOR TEST GENERATION

(71) Applicant: Zoom Video Communications, Inc., San Jose, CA (US)

(72) Inventors: Dezhi Bi, Hangzhou (CN); Jianglong Cao, Hangzhou (CN); Yalin Chen, Hangzhou (CN); Zhongqiang Gao, Hangzhou (CN); Zhipeng Xu, Hangzhou (CN); Haisong Yan, Hangzhou (CN); Jinhong Zhang, Hangzhou (CN); Aimin Zhu, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 14 days.

(21) Appl. No.: 18/410,045

(22) Filed: Jan. 11, 2024

(51) Int. Cl.
*H04L 43/50* (2022.01)
*G06F 11/3668* (2025.01)

(52) U.S. Cl.
CPC .......... *H04L 43/50* (2013.01); *G06F 11/3684* (2013.01)

(58) Field of Classification Search
CPC .............................. H04L 43/50; G06F 11/3684
USPC ........................................................ 709/224
See application file for complete search history.

(56) References Cited

U.S. PATENT DOCUMENTS

| | | | | |
|---|---|---|---|---|
| 9,727,738 | B1* | 8/2017 | Kuhr | H04L 67/56 |
| 11,295,274 | B1* | 4/2022 | Ghasem Khan Ghajar | G06F 9/547 |
| 11,502,923 | B1* | 11/2022 | Kumar | G06F 16/986 |
| 2017/0142233 | A1* | 5/2017 | Boucadair | H04L 41/0654 |
| 2022/0222089 | A1* | 7/2022 | Joshi | G06F 16/953 |
| 2022/0374334 | A1* | 11/2022 | Brown | G06F 11/3698 |
| 2023/0041844 | A1* | 2/2023 | Feng | H04L 63/1408 |
| 2024/0394412 | A1* | 11/2024 | Shin | G06F 21/6245 |

OTHER PUBLICATIONS

Develop "Design The User Interface", Extensions / Develop, Chrome For Developer, 8 pages.

* cited by examiner

*Primary Examiner* — Karen C Tang
(74) *Attorney, Agent, or Firm* — Kilpatrick Townsend & Stockton LLP

(57) ABSTRACT

Techniques for recording network information for test generation are disclosed. In an example method, a client device installs a web browser extension for capturing network information. The client device applies a configuration, using a network configuration tool, about a first application programming interface (API) transaction and configures the web browser extension to execute the first API transaction. The client device executes the first API transaction, in which the web browser extension captures first network information about the first API transaction including first request message information and first response message information. The client device receives the first network information about the first API transaction and generates and outputs standardized test information based on the first network information to a test case generation service. The client device then receives an indication, from the test case generation service, of a generated test case based on the first network information.

20 Claims, 10 Drawing Sheets

RECORDING NETWORK INFORMATION FOR TEST GENERATION

FIELD

The present application generally relates to automated software testing, and more particularly relates to techniques for recording network information for test generation.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 6 shows an example graphical user interface (GUI) that may be used with a client device for recording network information for test generation, according to some aspects of the present disclosure.

FIG. 8 shows another example GUI that may be used with a test case generation service for recording network information for test generation, according to some aspects of the present disclosure.

DETAILED DESCRIPTION

Figure 1:
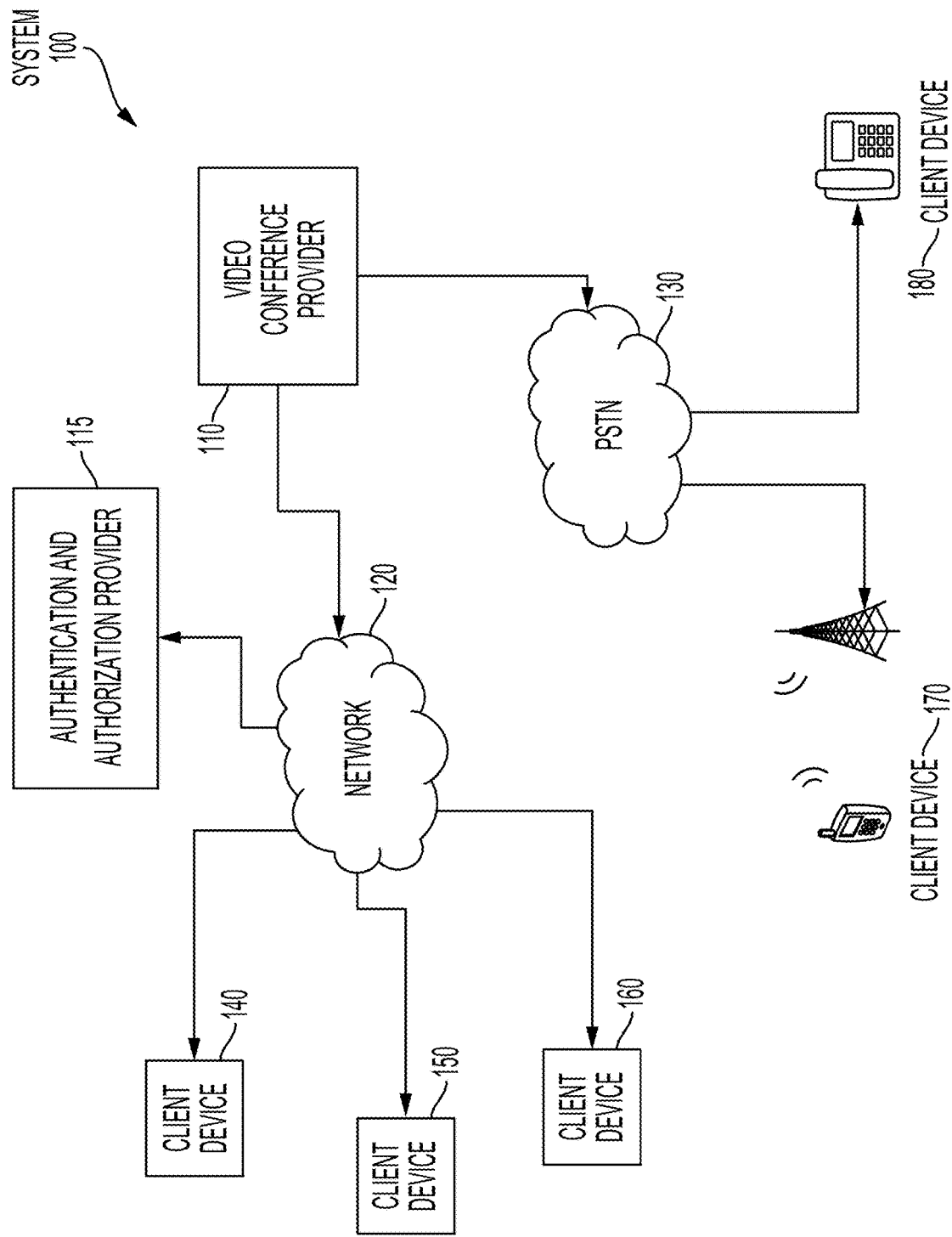
FIG. 1 shows an example system that provides videoconferencing functionality to various client devices, according to some aspects of the present disclosure.

Examples are described herein in the context of techniques for recording network information for test generation. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Robust video conferencing platforms are by now pillars of the communications backbone of the modern Internet. Such robustness and reliability comes at cost, however. Specifically, building and maintaining robust video conferencing platforms involves complex software that must be continuously and thoroughly tested.

A typical configuration may involve a client device and a server. The client device sends and receives data from the server via one of many application programming interface (API) endpoints, such as Hypertext Transfer Protocol (HTTP) endpoints associated with a web-based API. Testing such API transactions can involve large numbers of verifications. Similar or identical verifications may be required for different tests. The authoring of similar tests can be repetitive and time-consuming. For example, hundreds or more configurations for a single API endpoint may need to be tested to obtain full coverage of all possible scenarios of interest. Moreover, manual authoring of such tests may be error-prone or inconsistent. For example, copy/paste errors can easily be carried forward or tests may be caused to pass that should fail, merely due to a lucky misconfiguration.

In addition to the practical problems associated with authoring API tests, application developers who are not familiar with API interface definitions or lack an in-depth understanding of such definitions may find the creation of complex API test cases to be challenging. For instance, some test cases may involve multiple steps of authentication and configuration before reaching the component under test. Likewise, API endpoints with inadequate or missing documentation may be found in some contexts. In such cases, a substantial amount of time to acquire or comprehend interface information using trial and error may be required to author tests. API endpoint definition changes, particularly when they are undocumented or not communicated, may require manual test updates triggered by an unexpected failure of one or more test cases.

These difficulties can be addressed using techniques for recording network information for test generation. For example, a web browser plugin or extension can be used to capture network traffic going to and from an API endpoint. The captured network traffic information can then be used to automatically generate test cases that can reproduce the circumstances of the captured traffic and to execute the tests later to verify proper operation of the API endpoints following code changes or for regressions during production operations.

The following non-limiting example is provided to introduce certain related concepts. In an example method, a computing device, such as a laptop or desktop computer used by a test engineer, is executing a web browser. A web browser extension for capturing network information is installed on the computing device. The computing device then applies a configuration, using a network configuration tool, about a first application programming interface (API) transaction. For instance, the network configuration tool may be an embedded web browser debugging tool that can apply specific configurations such as filters to particular API transactions. Using filters, a particular string may be added to an HTTP header or certain API requests can be allowed or disallowed to reproduce a particular testing context.

The computing device then configures the web browser extension to execute the first API transaction. For example, the web browser may be caused to log into a particular web page and take an action, like scheduling a video conference or updating a profile. Actions like these may involve making dozens of API requests. In some examples, navigation to a particular webpage and taking particular actions has the effect of configuring the web browser to execute various API transactions. The computing device is thus caused to execute the API transaction. Before, during, and after the execution of the API transaction, the web browser extension captures network information about the API transaction including request message information and response message information.

The computing device then generates standardized test information based on the network information. For example, a JavaScript Object Notation (JSON) data structure can be generated according to a predefined schema that is standardized across an organization or across multiple organizations. The use of the standardized test information thus allows test engineers to share information in a standardized format regardless of the format in which the information was captured or ephemerally persisted by the web browser or the web browser extension.

The computing device outputs the standardized test information to a test case generation service. For example, application developers using the computing device for test development may use a test case generation service hosted on another computing device or in a distributed cloud network for test case generation. The computing device, after expiration of some time for processing, receives an indication, from the test case generation service, of a generated test case based on the first network information. For instance, the test case generation service may receive network information detailing the API transaction and all associated configurations in a standardized format used for all API transactions across an organization. A test case that includes steps for execution of the API transaction and expectations that include verifications to be made upon completion of the API transaction in the context of an executed test case.

The innovations of the present disclosure provide significant improvements in technical field of automated software testing. Typical API test suites may have hundreds or even more test cases for a single API endpoint. Thus, manual authoring of very similar tests can be repetitive and time-consuming and can involve error-prone shortcuts such as copying existing code. Errors in copied code can easily be carried forward causing cascading failures. Unexpected or undocumented API endpoint definition changes can cause errors in both testing and production environments. Using the techniques disclosed herein, errors in tests will be reduced and production code will be strengthened, both contributing to an overall reduction in consumption of computing and memory resources. The use of standardized test information and a uniform test design across an organization can likewise reduce error rates and computational efficiency through optimization of the generated test code. Additionally, the capture of network in formation for the generation of test cases can enable accurate generation of test cases without a lengthy, ponderous incremental build or trial and error process, reducing the burden on the network in terms of overall network traffic. Lower error rates can likewise reduce the overall amount of network traffic.

These illustrative examples are given to introduce the reader to the general subject matter discussed herein and the disclosure is not limited to these examples. The following sections describe various additional non-limiting techniques for recording network information for test generation.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the chat and video conference provider 110 over a public network.

The system optionally also includes one or more user identity providers, e.g., user identity provider 115, which can provide user identity services to users of the client devices 140-160 and may authenticate user identities of one or more users to the chat and video conference provider 110. In this example, the user identity provider 115 is operated by a different entity than the chat and video conference provider 110, though in some examples, they may be the same entity.

Figure 2:
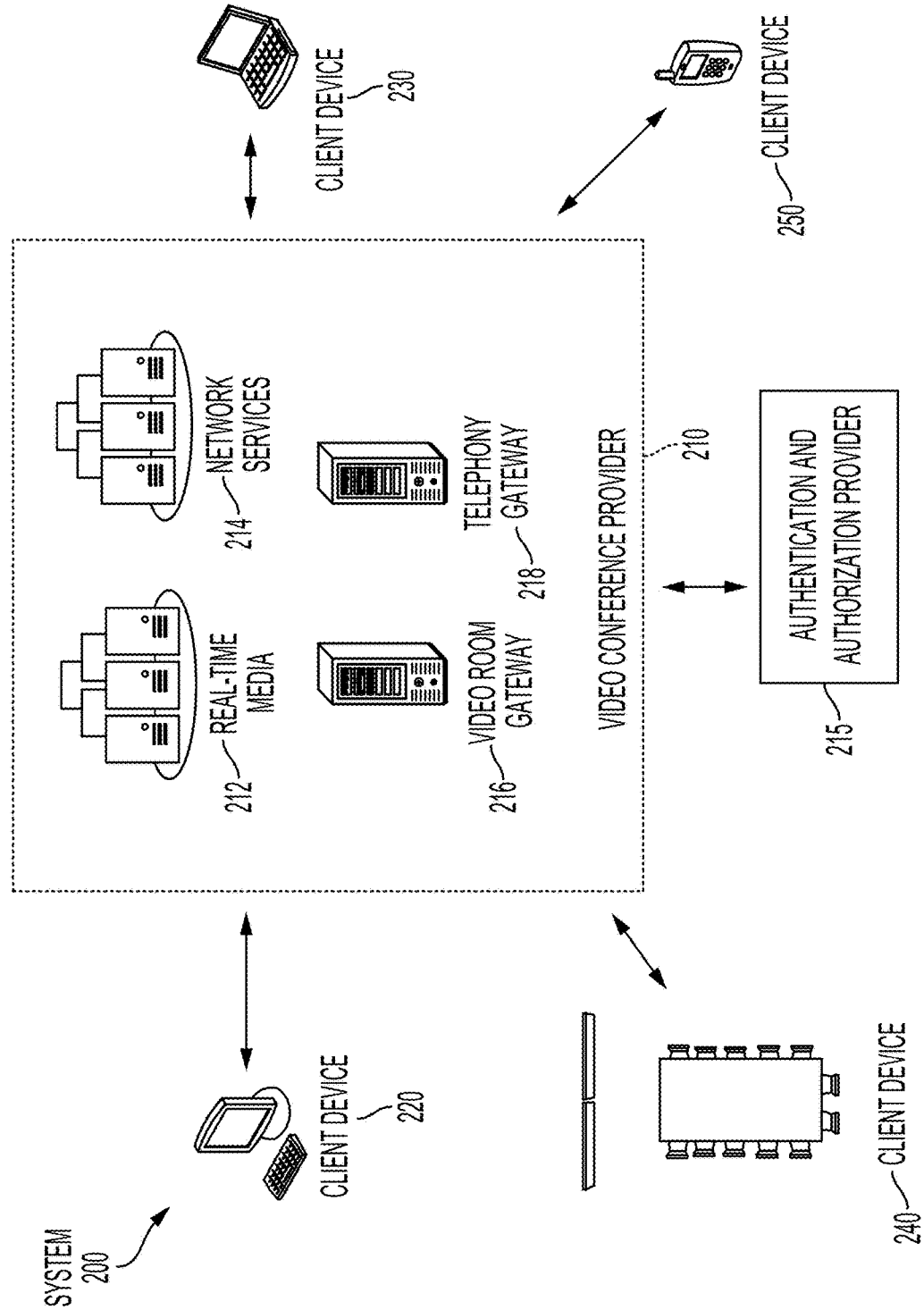
FIG. 2 shows an example system in which a video conference provider provides videoconferencing functionality to various client devices, according to some aspects of the present disclosure.

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the chat and video conference provider 110.

A user identity provider 115 may be any entity trusted by the chat and video conference provider 110 that can help identify a user to the chat and video conference provider 110. For example, a trusted entity may be a server operated by a business or other organization with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as two-factor authentication. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the chat and video conference provider 110.

When the user accesses the chat and video conference provider 110 using a client device, the chat and video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide user identification information to identify the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the chat and video conference provider 110, even in cases where the user has an authenticated identity and employs a client device capable of identifying the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more user identity providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the chat and video conference provider 210, or scheduling a new meeting, by interacting with the network services servers 214.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some embodiments, in addition to the video conferencing functionality described above, the chat and video conference provider 210 (or the chat and video conference provider 110) may provide a chat functionality. Chat functionality may be implemented using a message and presence protocol and coordinated by way of a message and presence gateway 217. In such examples, the chat and video conference provider 210 may allow a user to create one or more chat channels where the user may exchange messages with other users (e.g., members) that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and video conference provider 210 may provide permission to a user and/or an owner of the chat channel may provide permission to the user. Furthermore, there may be any number of members permitted in the chat channel.

Similar to the formation of a meeting, a chat channel may be provided by a server where messages exchanged between members of the chat channel are received and then directed to respective client devices. For example, if the client devices 220-250 are part of the same chat channel, messages may be exchanged between the client devices 220-240 via the chat and video conference provider 210 in a manner similar to how a meeting is hosted by the chat and video conference provider 210.

Figure 3:
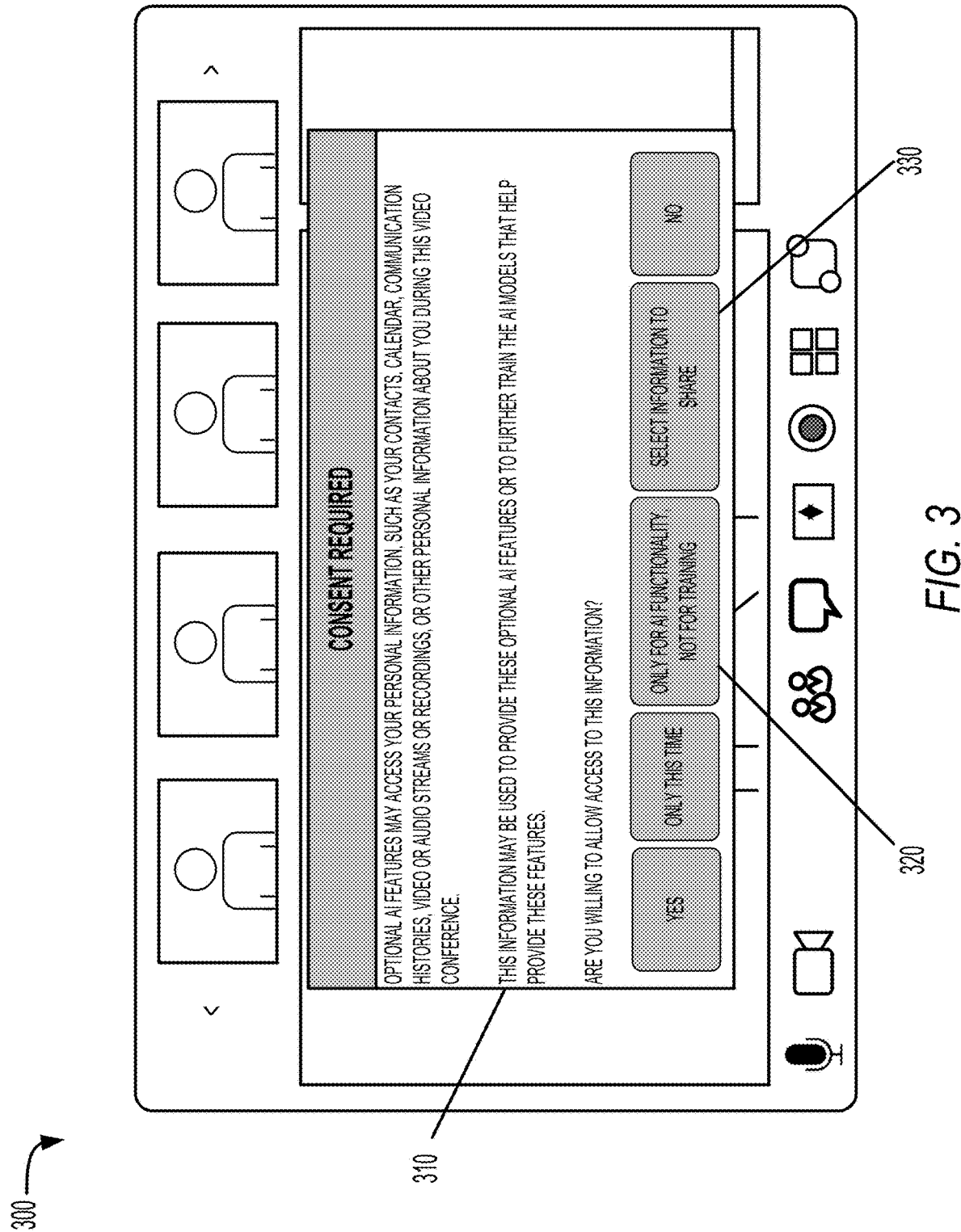
FIG. 3 shows an example user interface that may be used in some example systems configured for techniques for recording network information for test generation, according to some aspects of the present disclosure.

Turning next to FIG. 3, FIG. 3 shows an example user interface 300 that may be used in some example systems configured for recording network information for test generation. In some examples according to the present disclosure, a user may select an option to use one or more optional AI features available from the virtual conference provider 302. The use of these optional AI features may involve providing the user's personal information to the AI models underlying the AI features. The personal information may include the user's contacts, calendar, communication histories, video or audio streams, recordings of the video or audio streams, transcripts of audio or video conferences, or any other personal information available the virtual conference provider. Further, the audio or video feeds may include the user's speech, which includes the user's speaking patterns, cadence, diction, timbre, and pitch; the user's appearance and likeness, which may include facial movements, eye movements, arm or hand movements, and body movements, all of which may be employed to provide the optional AI features or to train the underlying AI models.

Before capturing and using any such information, whether to provide optional AI features or to providing training data for the underlying AI models, the user may be provided with an option to consent, or deny consent, to access and use some or all of the user's personal information. In general, Zoom's goal is to invest in AI-driven innovation that enhances user experience and productivity while prioritizing trust, safety, and privacy. Without the user's explicit, informed consent, the user's personal information will not be used with any AI functionality or as training data for any AI model. Additionally, these optional AI features are turned off by default-account owners and administrators control whether to enable these AI features for their accounts, and if enabled, individual users may determine whether to provide consent to use their personal information.

As can be seen in FIG. 3, a user has engaged in a video conference and has selected an option to use an available optional AI feature. In response, the GUI has displayed a consent authorization window 310 for the user to interact with. The consent authorization window 310 informs the user that their request may involve the optional AI feature accessing multiple different types of information, which may be personal to the user. The user can then decide whether to grant permission or not to the optional AI feature generally, or only in a limited capacity. For example, the user may select an option 320 to only allow the AI functionality to use the personal information to provide the AI functionality, but not for training of the underlying AI models. In addition, the user is presented with the option 330 to select which types of information may be shared and for what purpose, such as to provide the AI functionality or to allow use for training underlying AI models.

Figure 4:
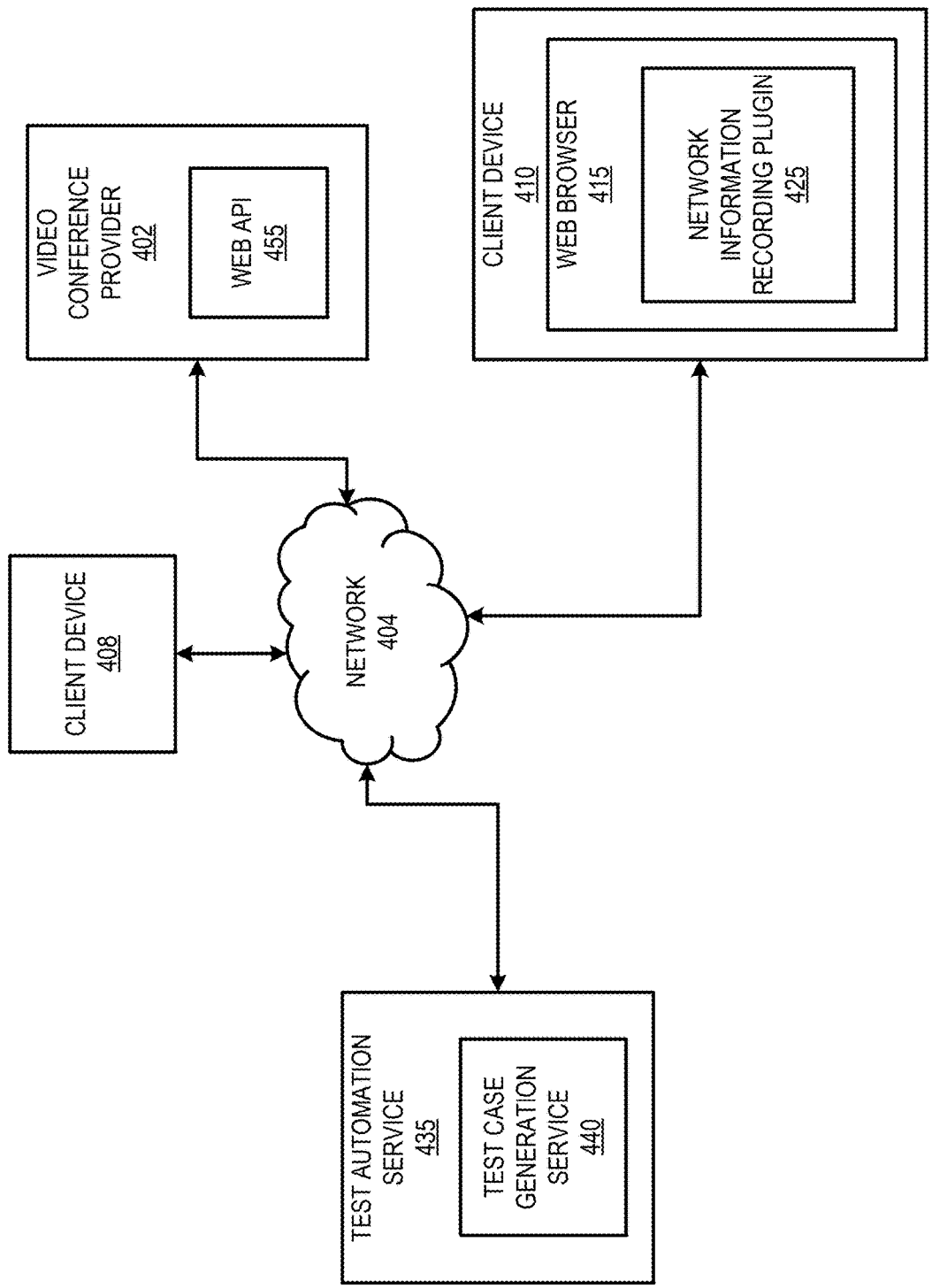
FIG. 4 shows an example of a system for recording network information for test generation, according to some aspects of the present disclosure.

Referring now to FIG. 4, FIG. 4 shows an example of a system 400 for recording network information for test generation. System 400 includes two client devices 408, 410 communicatively coupled with video conference provider 402 over a network 404. Network 404 may include the Internet, public networks, private networks, or combinations thereof. Video conference provider 402 is typically a server or collection of servers, including a combination of privately or cloud-hosted devices. Video conference provider 402 may be similar, in some respects, to the video conference providers 110, 210 described above with respect to FIGS. 1 and 2.

Client devices 408, 410 may be any type of device capable of executing the appropriate client software for video conferencing and related applications (e.g., chat, email, etc.). In some examples, the client devices 408, 410 interact with the video conference provider 402 by way of a series of transactions with a web application programming interface (API) 455 hosted by the video conference provider 402. For example, the web API 465 may be a hypertext transfer protocol (HTTP) API. In this example, the transaction is an HTTP transaction in which the client device 408, 410 sends an HTTP request message to the web API 465 and receives, in turn, an HTTP response message. API transactions of this type are examples of the types of API transactions tested using the techniques of the present disclosure. Other examples of APIs that can be used with the techniques disclosed herein include SOAP-based webservices, GraphQL APIs, JSON-RPC and XML-RPC for remote procedure calls, OAuth APIs for authentication, and WebSockets for real-time bi-directional communication, among others.

Client devices 408, 410 can also execute web browsing software. For example, client device 410 includes a web browser 415. The web browser 415 can be any suitable client software for accessing websites over the "world wide web" using the HTTP protocol. For example, the web browser 415 can be a standard web browser, a mobile browser, a text-based browser, a command line HTTP client, a REST API testing tool, an HTTP client library, and so on. In some examples, the web browser 415 may be an open-source or commercially available web browser such as Google Chrome, Mozilla Firefox, Apple Safari, or Microsoft Edge, among many others.

The web browser 415 can be extended using a plugin, extension, or add-on framework. For instance, the web browser 415 may provide an API for third-party application developers to author web browser plugins using a suitable programming language. The web browser 415 includes network information recording plugin 425, developed using such a framework. The network information recording plugin 425 can, for example, record network information for generating test cases. The network information recording plugin 425 is installed on web browser 415 through manual user commands using an installation archive or package or by commands executed by an organization administrator.

As used herein, the term "test case" refers generally to the initial conditions, test steps, and expectations associated with verifying that a particular aspect of a software application or feature is working as intended. For example, a test case may include a series of steps, each including a number of API transactions. In some examples, a test suite or other suitable grouping may include one or more test cases.

While the web browser 415 and network information recording plugin 425 can be used in any environment, typical configurations are used in testing environments. Some embodiments are not intended for deployment in production environments. Such restrictions may be implemented to avoid the capture or recording of actual user data in order to mitigate potential security or privacy concerns.

The network information recording plugin 425 can generate standardized test information based on the recorded network information and output the standardized test information to a test case generation service 440. The standardized test information may be, for example, a JSON file representing the recorded network information as an HTTP Archive (HAR) format. In the example of system 400, the test case generation service 440 is a component of a test automation service 435. The test case generation service 440 can then generate a test case based on the standardized test information. In some examples, the test automation service 435 can be used for subsequent execution of the test case including verification of the associated expectations.

The test case generation service 440, upon generation of the test case, can send an indication of the generated test case based on the network information to the network information recording plugin 425. For example, the indication may be a message indicating that the test case has been successfully generated. In some examples, the indication can include alerts, notifications, warnings, alarms, emails, push notifications, and so on.

Figure 5:
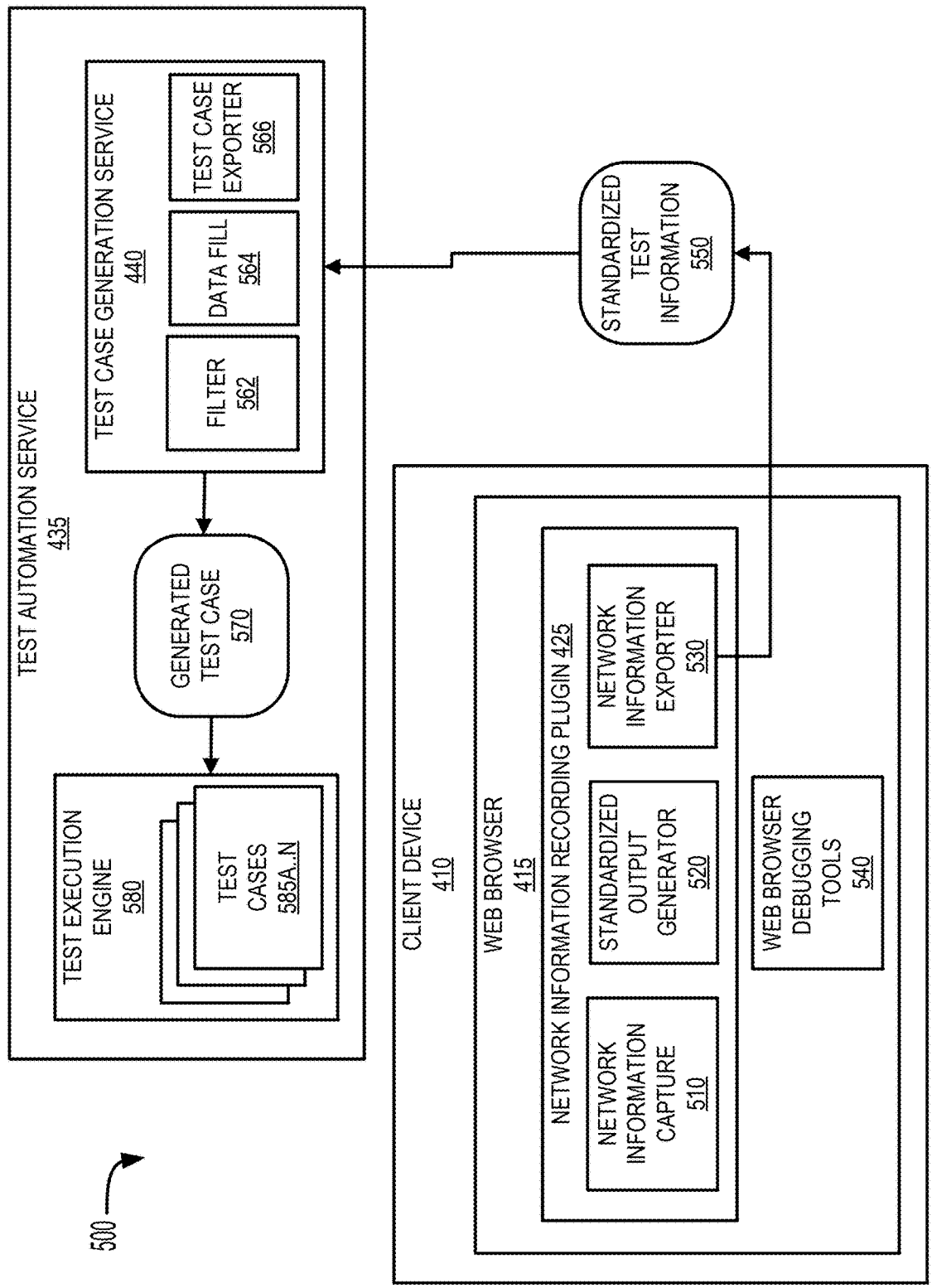
FIG. 5 shows a detail view of a system for recording network information for test generation, according to some aspects of the present disclosure.

Turning next to FIG. 5, FIG. 5 shows a system 500 including a detail view of an example test automation service 435 implementation and a detail view of an example web browser 415 including a network information recording plugin 425 and web browser debugging tools 540. The web browser debugging tools 540 include utilities for inspecting and debug web page elements. In some examples, the web browser debugging tools 540 can include a console for viewing and managing web application logs; a script execution function; an elements panel for editing of HTML, CSS, or other web page elements; network tools for monitoring, capturing, or analyzing HTTP requests and responses including filters for controlling the scope of web browser 415 activity; a web browser 415 storage editor for browsing or editing cookies, local storage, or session data; and other functions.

Prior to capturing of the network information by the network information recording plugin 425, the web browser debugging tools 540 can be used to apply a configuration relating to an API transaction associated with a planned test case. For example, a particular webpage may include program code for downloading content from various third-party sources besides the target API (e.g., images, advertisements, JavaScript, etc.). The web browser debugging tools 540 can be used, prior to capturing the network information, to filter web requests that should be not included in the standardized test information 550 output to the test case generation service 440.

The network information recording plugin 425 includes a network information capture component 427. For example, the network information capture component 427 may include a script, such as a JavaScript script, that captures network requests using APIs exposed by the web browser 415. The network information capture component 427 can capture, for instance, HTTP requests and HTTP responses, as well as user interactions, that can be ephemerally stored in a suitable data structure prior to conversion into the standardized test information 550. For instance, the captured network information can be kept in web browser local storage or in the temporary memory available to the executing script, such as JavaScript runtime's memory heap.

The network information recording plugin 425 also includes a standardized output generator 429 for converting the captured network information into the standardized test information 550. The standardized test information 550 output by the network information recording plugin 425 may be in a structured data format such as JSON or XML. The standardized test information may be, for example, a JSON object or file using the HTTP Archive (HAR) format. Other standardized formats may be used such as the PCAP (Packet Capture) format, web server (e.g., Apache, NGINX, etc.) log format, curl input, proprietary formats as used by the Fiddler or Charles Proxy software packages, and so on. In addition, an application or associated organization may use custom formats for recorded HTTP data such as well-defined, custom JSON or XML formats. The use of the standardized test information 550 allows test engineers or other users to record HTTP traffic using a variety of browser technologies with a suitable extension for recording the HTTP traffic, and to share the recorded information immediately following recording in a standardized format regardless of the particular web browser 315 implementation.

The standardized output generator 429 can receive the captured network information, instantiate a suitable data structure for conversion into the standardized test information 550, and then copy/translate elements from the captured network information into the corresponding elements of the data structure. For instance, the network information may be captured as a text string or text stream. Elements such as headers, parameters, etc. may need to be identified, parsed out, extracted, labeled, and so on, before they can be copied to the instantiated data structure.

The network information recording plugin 425 includes a network information exporter 431. The network information exporter 431 prepares the data structure associated with the standardized test information 550 for transmission. For example, the data structure may be serialized in preparation for transmission. The network information exporter 431 outputs the standardized test information 550 for test case generation. For instance, the test case generation service 440 may provide a web API that can be used to upload the standardized test information 550. In some other examples, the network information exporter 431 can export the standardized test information 550 in a format suitable for manual upload to the test case generation service 440. For instance, the serialized standardized test information 550 can be shown to the user in a GUI or web form. The user can then select and copy the serialized standardized test information 550 and manually send it to the test case generation service 440. The test case generation service 440, may allow for the standardized test information 550 to be pasted into a GUI or web form, uploaded, emailed, and so on.

The test case generation service 440 includes components for conversion of the received standardized test information 550 to one or more test cases. As depicted in the example system 500, test case generation service 440 includes a filter 562. The filter 562 can be configured to remove specified elements of the standardized test information 550 before generation of a test case. For instance, it may be desirable to remove all portions of the important network information besides API transactions involving a particular domain name or besides API transactions involving a specific API endpoint, depending on the desired scope of the test case. In some examples, the filter 562 can be used for related operations such as de-duplication.

The test case generation service 440 includes a data fill component 564. The data fill component 564 can create or instantiate a suitable data structure for generation of a test case. The data fill component 564 can use the standardized test information 550 to populate the fields and other attributes of the data structure. In some examples, the elements of the standardized test information 550 can be amended or augmented with additional information. For example, if the network information is captured in a production environment, the data fill component 564 may transpose some elements (e.g., hostnames) to correspond to a test environment.

The test case generation service 440 includes a test case exporter 566. The test case exporter 566 receives the data structure filled by the data fill component 564 and converts it into a format suitable for transmission to the test execution engine 580. For instance, the test case exporter 566 may create a data object such as a JSON object that is the generated test case 570.

The generated test case 570 may be sent to the test execution engine 580. The generated test case 570 may be added to the test cases 585A . . . N configured for execution as part of, for example, a test suit. In some examples, the generated test case 570 may be executed individually by the test execution engine 580 or using another external component for execution, such as a remote server or personal computer. The generated test case 570 may be caused to execute through manual commands output by a test engineer or other user or through automatic execution as by, for example, automatic, periodic execution of the test suite. For instance, the generated test case 570 may be added to a suite of tests that are executed daily or following every code change.

Figure 6:
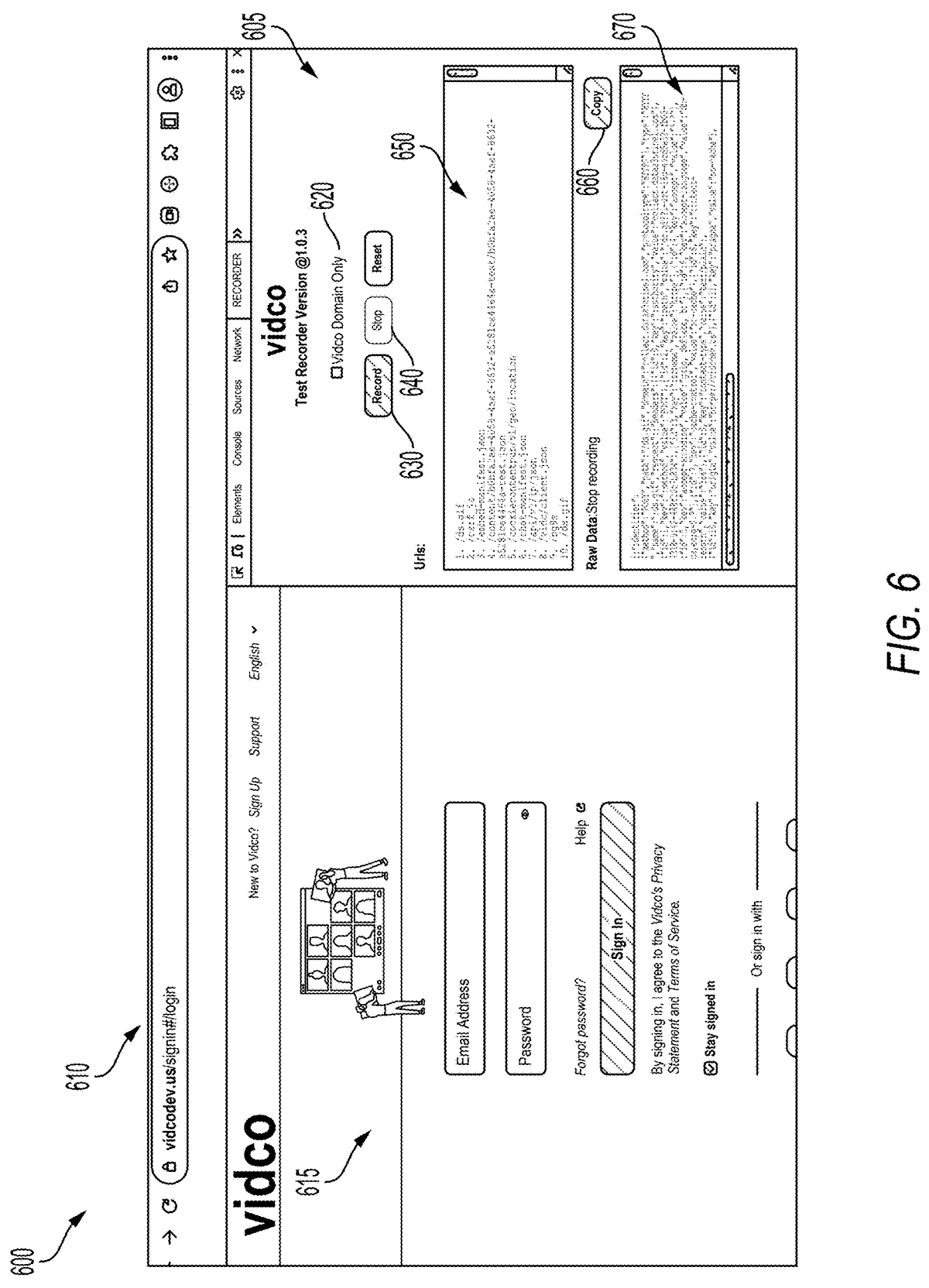

Referring now to FIG. 6, FIG. 6 shows an example graphical user interface (GUI) 600 that may be used with a client device 410 for recording network information for test generation. The example GUI 600 depicts the network information recording plugin 425 executing in a web browser 415, following installation, configured for executing and recording an API transaction. The web browser 415 shown has a typical set of web browser controls, including an address bar 610. The address bar 610 shows the web page currently loaded in the web browser, as shown in main view 615. In this example, a login screen is shown, having the path "/login" in the address bar 610 and showing typical elements of the login screen in main view 615, such as an email address input box and a password input box. The API transaction under test may be, for example, a call to an "/authenticate" API endpoint that verifies that the password entered by the user is valid and corresponds to the email address.

The web browser debugging tools 540 are depicted in the web browser debugging tools window 605. The GUI for the network information recording plugin 425 is shown as a tab in web browser debugging tools 605 labeled "Recorder," among other functions of the web browser debugging tools 540 such as the "Network" tab and the "Elements" tab. Other configurations for the network information recording plugin 425 are possible as well. For instance, the network information recording plugin 425 could expose a GUI that could be loaded as a standard web page in another tab.

The network information recording plugin 425 includes a filter checkbox 620. The filter checkbox 620 can be used to limit the capture of network information to elements with particular characteristics such as a certain domain name, IP address, path contents, cookie, and so on. In the example filter checkbox 620 shown in FIG. 6, the filter is configured to filter out all API transactions not directed to a particular domain name.

The network information recording plugin 425 includes a record button 630 and a stop button 640. For example, a test engineer or other user may prepare to record network information for a test case my manually setting up the initial conditions in the web browser 415 using controls such as the address bar 610. When the portion of the web page interaction that includes the API transactions under test is reached, the user can click the record button 630 to begin the recording of network information by the network information recording plugin 425. In some examples, upon receiving an indication that the record button 630 has been pushed, the network information recording plugin 425 can begin to capture an ephemerally store the network information. The user may then proceed with interactions with the web page, such as logging into the website in this example. For instance, the user can enter an email address and password and then click the "Sign In" button to cause an API transaction with the "/authenticate" API endpoint. Upon completion of the interaction, the stop button 640 can be pushed to halt recording.

The captured network information summary window 650 shows a chronological list of captured API transactions, labeled by the last portion of the API endpoint path. The captured network information summary window 650 can be configured to show other information about the captured network information as well.

The standardized test information output window 660 shows the captured network information in a serialized, standardized form, suitable for export from the network information recording plugin 425 and subsequent import into the test case generation service 440. For example, the standardized test information output window 660 may show the captured network information as a JSON filed that can be manually copied and pasted (e.g., using the operating system clipboard) into a GUI provided by the test case generation service 440, such as the one shown in FIG. 7.

Figure 7:
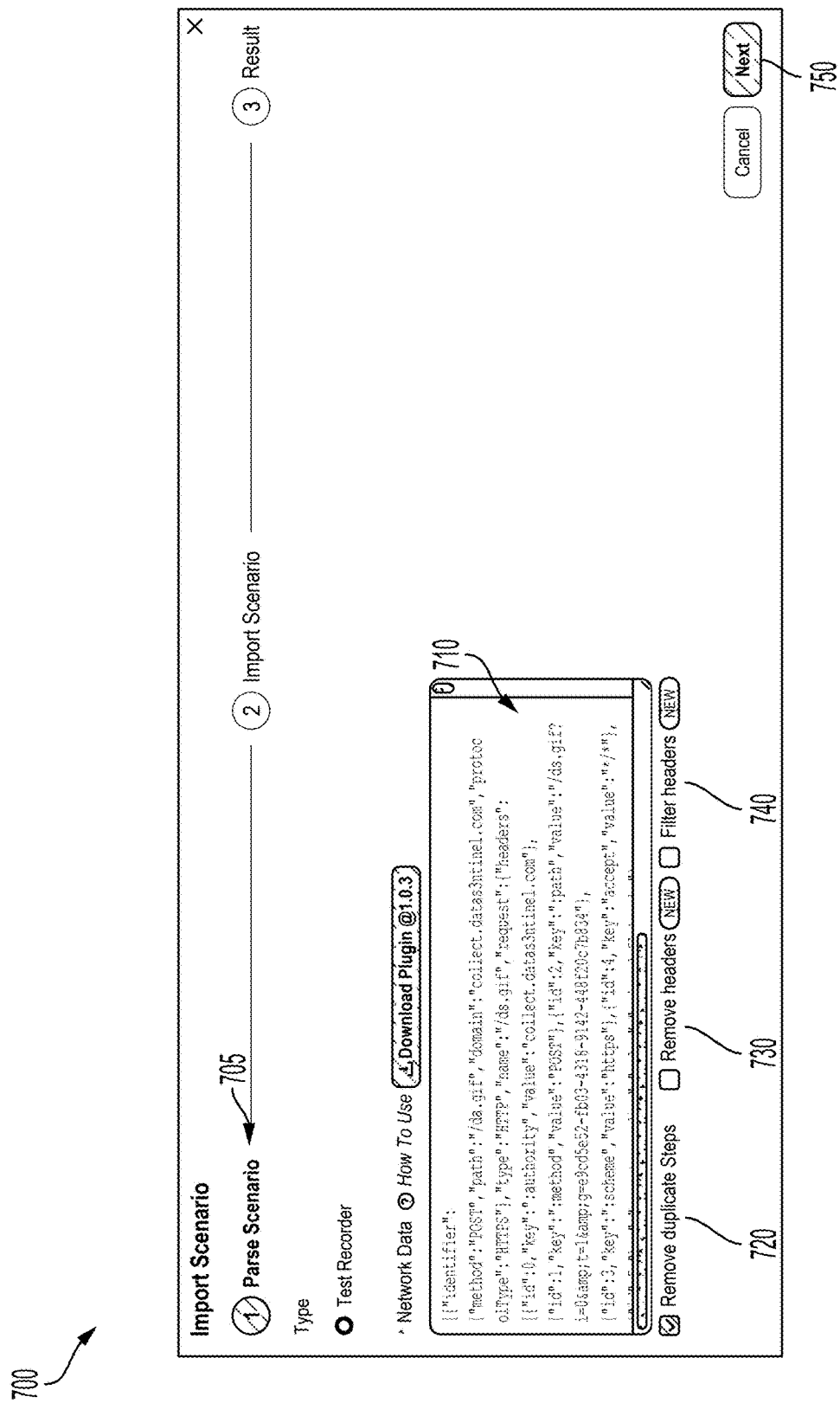
FIG. 7 shows an example GUI that may be used with a test case generation service for recording network information for test generation, according to some aspects of the present disclosure.

FIG. 7 shows an example graphical user interface (GUI) 700 that may be used with a test case generation service 440 for recording network information for test generation. The example GUI 700 depicts a GUI as may be seen in a web browser 415, in in which the test case generation service 440 is accessed using the web over the Internet or a local network. The GUI 700 is shown with a parse scenario page 705 selected. The parse scenario page may be used for importing the standardized test information 550 and applying certain configurations. The standardized test information 550 as may be copied from the standardized test information output window 660 shown in FIG. 6 can be copied into the standardized test information input box 710.

Before import into the test case generation service 440, one or more additional filters or configurations may be applied to the standardized test information 550. For instance, a de-duplication filter 720 may be applied that removes instances where identical API transactions are repeated. In another example, a header removal filter 730 can be applied that removes some or all header information from the standardized test information 550. In yet another example, a header filter control 740 can be applied that filters in or out certain headers according to a given configuration. For example, the header filter control 740 could be configured to remove headers that contain personal information, such as actual user login information, prior to being uploaded to the test case generation service 440. Following transmission (e.g., pasting) of the standardized test information 550 to the standardized test information input box 710, the next button 750 can be used to advance the importation to the next page, as is illustrated in FIG. 8.

Figure 8:
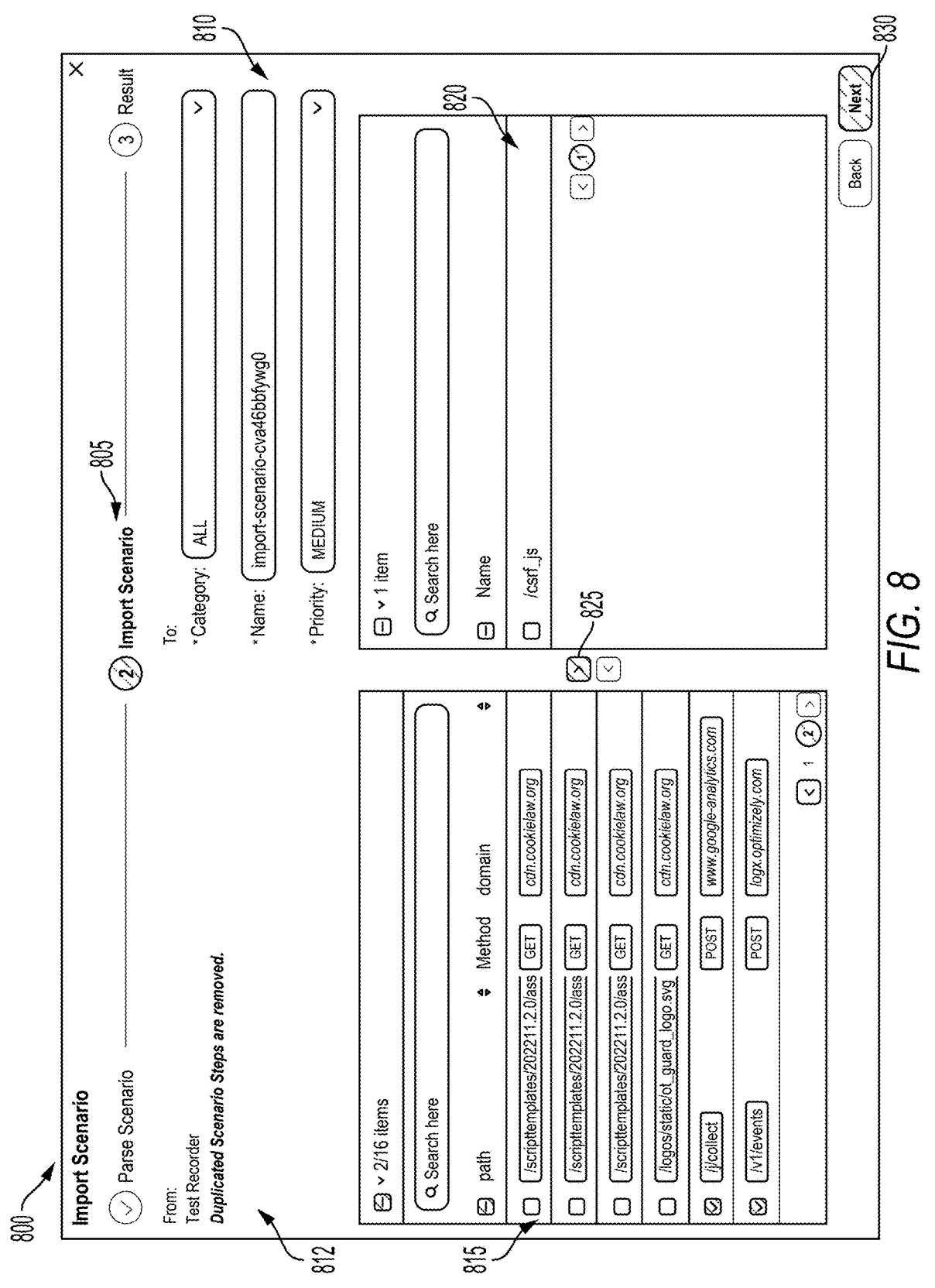

FIG. 8 shows an example graphical user interface (GUI) 800 that may be used with a test case generation service 440 for recording network information for test generation. The example GUI 800 depicts a GUI as may be seen in a web browser 415, in in which the test case generation service 440 is accessed using the web over the Internet or a local network. The GUI 800 is shown with an import scenario page 805 selected. The GUI 800 shows a preview of the imported standardized test information 550 reformatted to allow for viewing convenience or additional configuration prior to import to the test case generation service 440.

Descriptive information controls 810 can be used to update test case metadata such as test case, category (or other grouping), priority, and so on. Warning 812 shows a description of additional filters or configurations that were applied during the parse scenarios page 705. Other warnings or informational messages can also be displayed at warning 812.

Imported API transactions display window 815 shows a graphical depiction of the list of API transactions identified in the standardized test information 550. For example, the example listings in imported API transactions display window 815 show API endpoint path, HTTP method, domain name. However, other information could also be included for display here such as HTTP response status code, authentication information, timing data, and so on. In some examples of the listings in imported API transactions display window 815, only a subset may be desired to be imported into a generated test case 570. The API transaction selector control 825 can be used to select a subset of the listed API transactions using, for example, checkboxes. The selected API transactions can be shown in the selected API transactions display window 820. Following selection of the desired API transactions for test case generation, test case generation can be caused by pushing the next button 830. In some examples, after processing the standardized test information 550, the GUI 800 can receive an indication of the completion of test case generation and display a message, alert, or notification indication (not shown) that the test case has been generated.

Figure 9:
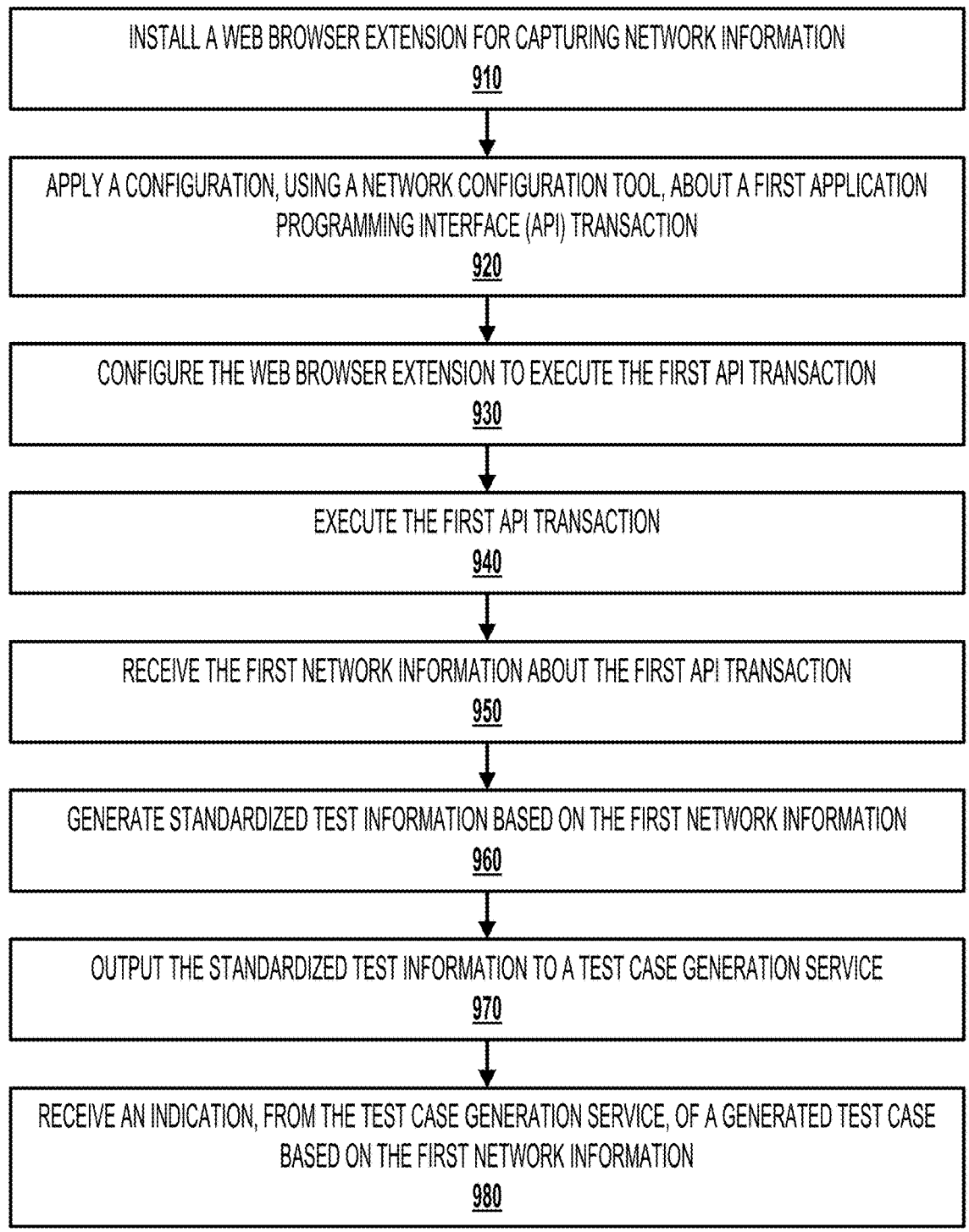
FIG. 9 shows a flowchart of an example method for recording network information for test generation, according to some aspects of the present disclosure.

Referring now to FIG. 9, FIG. 9 shows a flowchart of an example method 900 for recording network information for test generation. The description of the method 900 in FIG. 9 will be made with reference to FIGS. 4-8, however any suitable system according to this disclosure may be used, such as the example systems 100 and 200, shown in FIGS. 1 and 2. It should be appreciated that method 900 provides a particular method for recording network information for test generation. Other sequences of operations may also be performed according to alternative examples. For example, alternative examples of the present disclosure may perform the steps outlined above in a different order. Moreover, the individual operations illustrated by method 900 may include multiple sub-operations that may be performed in various sequences as appropriate to the individual operation. Furthermore, additional operations may be added or removed depending on the particular applications. Further, the operations described in method 900 may be performed by different devices. For example, the description is given from the perspective of the client device 410 but other configurations are possible. One of ordinary skill in the art would recognize many variations, modifications, and alternatives.

The method 900 may include block 910. At block 910, the client device 410 installs a web browser extension for capturing network information. For example, a test engineer or other user can cause the installation of the web browser extension such as the network information recording plugin 425, as described in FIGS. 4 and 5. The network information recording plugin 425 can be installed into a web browser 415 by selecting it from an app store, marketplace, or other curated collection of web browser extensions. For instance, an organization may provide an approved selection of web browser extensions approved for internal use to its members. In another example, an organization administrator can cause the installation into a web browser 415 using a packaged file or installation module in accordance with organizational group policy and security standards. Installation of the network information recording plugin 425 can enable the recording of network information for test generation.

Typical configurations of the network information recording plugin 425 can be used in testing environments and are not generally deployed in production environments to avoid the capture or recording of actual user data in order to mitigate potential security or privacy concerns. Some examples may include additional safeguards to prevent the capture of personally identifiable information such as verification of test environments, IP address restrictions, requirements relating to login and other authentication credentials, and so on.

At block 920, the client device 410 applies a configuration, using a network configuration tool, about a first application programming interface (API) transaction. For example, the network configuration tool may be a web browser debugging tools 540 embedded or otherwise included with the web browser 415, as described in FIG. 5. The web browser debugging tools window 605 of FIG. 6 depicts an example GUI that may be included with a web browser debugging tools 540. The web browser debugging tools 540 can include, for example, a network interaction editor and a filter, among other possible features. The network interaction editor can be used for viewing and modifying network requests and responses, prior to initiation capture of network information. The filter can be used to selectively view or allow network activity based on criteria such as file types, status codes, or domain names. These and other components of the web browser debugging tools 540 can be used to set the initial conditions and configure the capture of network information prior to recording for test case generation.

For example, the web browser debugging tools 540 may provide a control for selecting a domain filter for capture of network information. A domain filter can include a function that results in capture of network information that originates from or is destined for network addresses with a particular domain name. A domain name can include a fully-resolved network location including a path as well as an IP or other means of specifying a network location. In one example, a domain filter may be configured to capture only network traffic addressed to the domain "example.com." In that example, network traffic containing the string "example.com" may be included for capture. More complex configurations of the domain filter are also possible. For instance, the domain filter can be configured to use regular expressions, wildcards, or other pattern matching methods.

At block 930, the client device 410 configures the web browser extension to execute the first API transaction. In some examples, the capturing of network information can be enabled or disabled from the web browser 415. It may be desirable to avoid capturing of network information for test case generation when, for example, a test engineer is using the web browser 415 for non-testing purposes (e.g., viewing the news). The capturing of network information by the network information recording plugin 425 can, in some cases, be enabled or disabled using a control added to the web browser debugging tools 540. For instance, installation of the network information recording plugin 425 may cause a network information capture toggle selector switch to be added to the web browser debugging tools 540.

At block 940, the client device 410 executes the first API transaction, wherein the web browser extension captures first network information about the first API transaction including first request message information and first response message information. A particular API transaction may be caused by an interaction with a webpage as described in the "/login" example of FIG. 6. For example, a webpage may include a number of buttons or other controls. Interaction with those controls may cause interaction with an API. For instance, a web page may have a login button that causes user authentication data to be sent to an API endpoint for verifying the authentication data. The API transaction may be the subject of the test case that can be triggered through interaction with the web page, such as by clicking on the login button.

In some examples, the API transaction under test may be caused by an execution of a script that is executing in a context of a webpage. For example, revisiting the "/login" example of FIG. 6, the "/login" webpage, in addition to loading the GUI elements depicted in main window 615, may download JavaScript or other program code that can execute in the context of the "/login" page. For instance, upon entering an email address, the webpage may be caused to dispatch the input email address to a server for validation by JavaScript code, prior to depression of the "Sign In" button. The network information associated with such a validation using a suitable web API can be similarly captured using the techniques disclosed herein.

At block 950, the client device 410 receives the first network information about the first API transaction. For example, the network information recording plugin 425 may record the network information and ephemerally store it using a suitable data structure in the context of the memory space of the network information recording plugin 425, web browser local storage, or a remote storage location. The recorded network information can be identified with timestamps corresponding to the start and stop time of the network information capture.

In some examples, the client device receives images of the webpage during the interaction with the webpage. For example, comprehension of a test case out of context of the webpage that causes the API transaction may be difficult. The context of the webpage causing the API transaction may be necessary for understanding failures of related generated test cases. To address this issue, some examples can acquire images of the web page during the interaction so that a visual representation of the context is preserved. The acquired images can be included in the standardized test information and associated with the generated test case metadata. For example, the test automation service 435 can display the acquired images along with other information about the generated test case during test execution time for the benefit of test engineers or other users.

In some examples, the network information recording plugin 425 or other web browser extension can be configured to capture network information for generation of batch API test cases. A batch API test case can include a plurality of API transactions. In these examples, the network information recording plugin 425 is configured to execute additional API transactions. The network information associated with the additional API transactions can be captured by the network information recording plugin 425. The generated standardized test information can be based on both the first network information and the network information captured as a result of the additional API transactions. The generated standardized test information can then be used for generation of a batch API test case.

At block 960, the client device 410 generates standardized test information based on the first network information. For example, the network information recording plugin 425 may include a standardized output generator 520 for converting the captured network information into the standardized test information 550. The standardized test information 550 output by the network information recording plugin 425 may be in a structured data format such as JSON or XML. The standardized test information may be, for example, a JSON object or file using the HTTP Archive (HAR) format. Other standardized formats may be used such as the PCAP (Packet Capture) format, web server (e.g., Apache, NGINX, etc.) log format, curl input, proprietary formats as used by the Fiddler or Charles Proxy software packages, and so on.

In addition, an application or associated organization may use custom formats for recorded HTTP data such as well-defined, custom JSON or XML formats. The use of the standardized test information 550 allows test engineers or other users to record HTTP traffic using a variety of browser technologies with a suitable extension for recording the HTTP traffic, and to share the recorded information immediately following recording in a standardized format regardless of the particular web browser 315 implementation.

For example, an example of the standardized test information in the standard HAR format is given below:

```
{
    "log": {
        "version": "1.2",
        "creator": {
            "name": "Web Browser",
            "version": "Browser Version"
        },
        "entries": [
```

```
{
    "startedDateTime": "2023-12-01T12:00:00.000Z",
    "request": {
        "method": "GET",
        "url": "http://example.com",
        "headers": [ ],
        "queryString": [ ],
        "cookies": [ ],
        "headersSize": - 1,
        "bodySize": - 1
    },
    "response": {
        "status": 200,
        "statusText": "OK",
        "headers": [ ],
        "cookies": [ ],
        "content": {
            "size": 500,
            "mimeType": "text/html"
        },
        "redirectURL": "",
        "headersSize": -1,
        "bodySize": 500
    },
    "timings": {
        "blocked": 0,
        "dns": -1,
        "connect": 15,
        "send": 20,
        "wait": 38,
        "receive": 12,
        "ssl": -1
    }
}
]
}
}
```

The example HAR shown above includes JSON includes including API transaction meta data, request message, and response message. The HAR format can include other blocks and elements not included in this example. The example HAR shown also includes configuration information. The configuration information can include additional API (e.g., HTTP) client configuration information such as timeout configurations, retry configurations, or default headers.

At block 970, the client device 410 outputs the standardized test information to a test case generation service. For example, the network information exporter 530 described in FIG. 5 can produce a serialized version of the standardized test information 550 and output it to the test case generation service 440. In some examples, the standardized test information 550 can be sent automatically following capture of the network information. In some other examples, the standardized test information 550 can be manually passed to the test case generation service 440, as shown in FIGS. 7 and 8. For example, the text of the standardized test information 550 copied and pasted into a suitable GUI, a file can be downloaded/uploaded, the standardized test information 550 can be sent using a network tool such as a file transfer protocol (FTP) client, and so on.

At block 980, the client device 410 receives an indication, from the test case generation service, of a generated test case based on the first network information. For example, the test case generation service 440, after a suitable period of time for processing the standardized test information 550 and generating the generated test case 570, can return a message to the network information recording plugin 425 indicating that test case generation is complete. For instance, an API request, socket, WebSocket, callback, etc. can be used to send the message back to the web browser 415 to provide an indication to the user that the test case generation is complete and that the generated test case 570 is ready for execution. In some examples, the indication can include alerts, notifications, and emails.

For example, the generated test case may be based on processed standardized test information including, for each API transaction included in the standardized test information, a test case. The test case may include a test case configuration, such as initial configurations, prerequisites, preconditions, and so on. The test case may also include one or more steps. The steps can include the API transactions, including information needed to reproduce the API transactions by a suitable HTTP client. The test case may also include one or more expectations.

In some examples, the network information recording plugin 425 can be used to modify the generated test case after initial test case generation. For example, the network information recording plugin 425 can transmit, to the test case generation service 440, an indication to modify the generated test case, such a modification to or a modified copy of the standardized test information. The test case generation service 440 can receive the modification to or a modified copy of the standardized test information and process it. The network information recording plugin 425 can then receive, from the test case generation service 440, a modified test case based on the changed standardized test information. The modified test case may be sent to the test automation service 435 to overwrite or otherwise update the previously generated test case. For example, one example modification may include transmitting, to the test case generation service 440, an indication of a desire to append additional network information to the generated test case. For instance, one or more additional API transactions can be added to an existing test case. As above, following a suitable period for processing, the web browser 415 may receive, from the test case generation service 440, a modified test case based on the indication to append additional network information to the generated test case.

Figure 10:
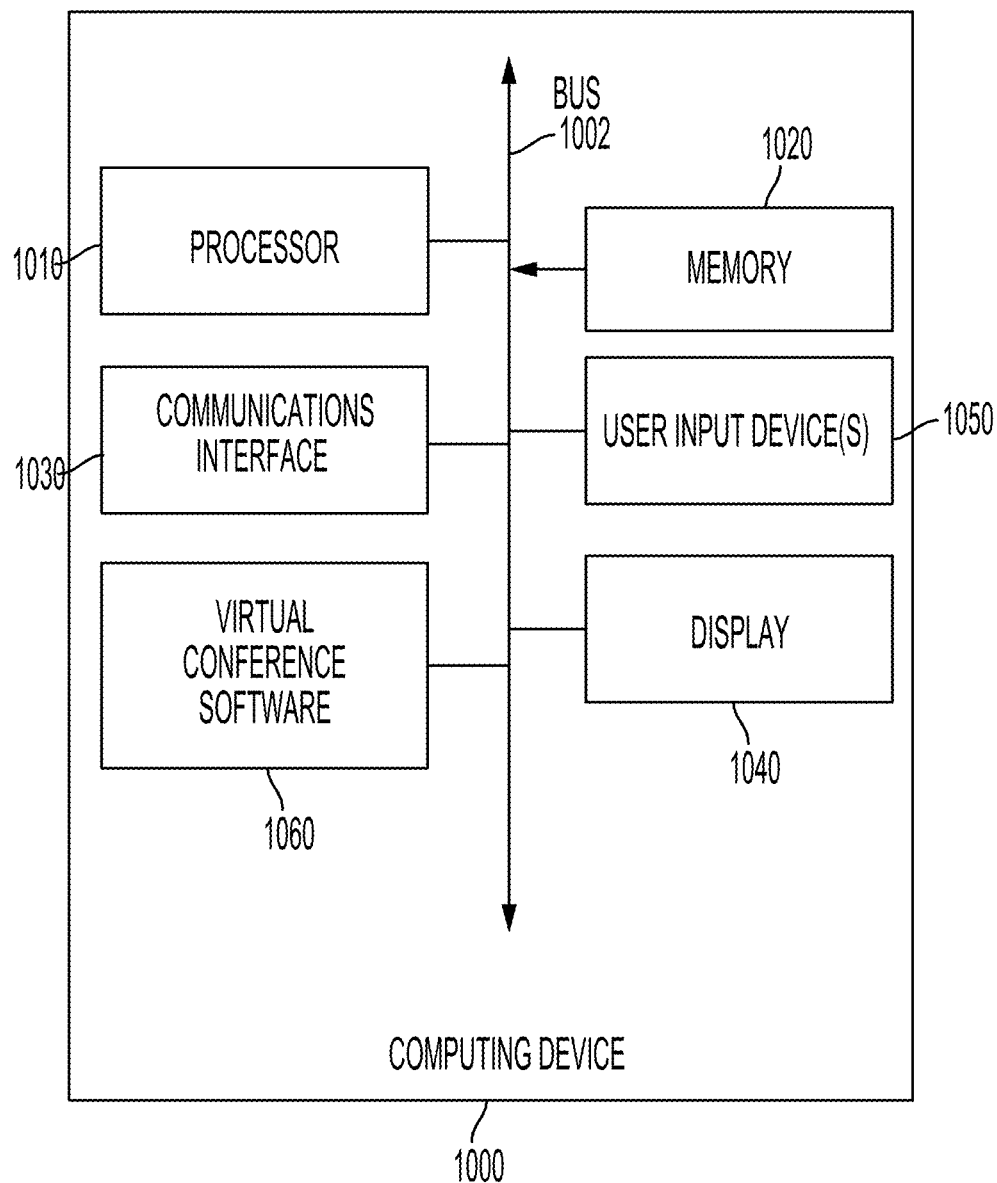
FIG. 10 shows an example computing device suitable for use in example systems or methods for recording network information for test generation, according to some aspects of the present disclosure.

Referring now to FIG. 10, FIG. 10 shows an example computing device 1000 suitable for use in example systems or methods for recording network information for test generation according to this disclosure. The example computing device 1000 includes a processor 1010 which is in communication with the memory 1020 and other components of the computing device 1000 using one or more communications buses 1002. The processor 1010 is configured to execute processor-executable instructions stored in the memory 1020 to perform one or more methods for recording network information for test generation according to different examples, such as part or all of the example method 900 described above with respect to FIG. 9. The computing device 1000, in this example, also includes one or more user input devices 1050, such as a keyboard, mouse, touchscreen, microphone, etc., to accept user input. The computing device 1000 also includes a display 1040 to provide visual output to a user.

In addition, the computing device 1000 includes virtual conferencing software 1060 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 1000 also includes a communications interface 1030. In some examples, the communications interface 1030 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

That which is claimed is: Example 1 is a method, comprising: installing a web browser extension for capturing network information; applying a configuration, using a network configuration tool, about a first application programming interface (API) transaction; configuring the web browser extension to execute the first API transaction; executing the first API transaction, wherein the web browser extension captures first network information about the first API transaction comprising first request message information and first response message information; receiving the first network information about the first API transaction; generating standardized test information based on the first network information; outputting the standardized test information to a test case generation service; and receiving an indication, from the test case generation service, of a generated test case based on the first network information.

Example 2 is the method of example(s) 1, wherein executing the API transaction is caused by an interaction with a webpage.

Example 3 is the method of example(s) 2, further comprising receiving one or more images of the webpage during the interaction with the webpage.

Example 4 is the method of example(s) 1, wherein the network configuration tool is a web browser debugging tool, the web browser debugging tool comprising at least a network interaction editor and a filter.

Example 5 is the method of example(s) 1, wherein the standardized test information based on the network information is based on JavaScript Object Notation (JSON).

Example 6 is the method of example(s) 1, further comprising: configuring the web browser extension to execute a second API transaction; executing the second API transaction, wherein the web browser extension captures second network information about the second API transaction comprising second request message information and second response message information; and receiving the second network information about the first API transaction, wherein: generating the standardized test information is based on the first network information and the second network information; the generated test case is based on the first network information and the second network information; and the generated test case is a batch API test comprising a plurality of API transactions.

Example 7 is the method of example(s) 1, further comprising receiving an indication of enablement of capturing network information, wherein the indication is caused by a first interaction with a web browser debugging tool.

Example 8 is the method of example(s) 7, further comprising receiving an indication of a selection of a domain filter, wherein the indication is caused by a second interaction with the web browser debugging tool.

Example 9 is the method of example(s) 1, wherein outputting the standardized test information to the test case generation service comprises transmitting, to a test case generator, the standardized test information, wherein the standardized test information comprises information about one or more API transactions.

Example 10 is the method of example(s) 9, wherein receiving the indication, from the test case generation service, of the generated test case based on the first network information comprises receiving, from the test case generator, processed standardized test information comprising, for each API transaction included in the standardized test information, a test case, the test case comprising a test case configuration, one or more steps, and one or more expectations.

Example 11 is the method of example(s) 9, further comprising: transmitting, to the test case generator, an indication to modify the generated test case; and receiving, from the test case generator, a modified test case based on the indication to modify the generated test case.

Example 12 is the method of example(s) 1, wherein: the API transaction is a Hypertext Transfer Protocol (HTTP) transaction; the first request message is an HTTP request; and the first response message is an HTTP response.

Example 13 is a non-transitory computer-readable medium storing instructions that, when executed by one or more processors, cause the one or more processors to perform operations including: installing a web browser extension for capturing network information; applying a configuration, using a network configuration tool, about a first application programming interface (API) transaction; configuring the web browser extension to execute the first API transaction; executing the first API transaction, wherein the web browser extension captures first network information about the first API transaction comprising first request message information and first response message information; receiving the first network information about the first API transaction; generating standardized test information based on the first network information; outputting the standardized test information to a test case generation service; and receiving an indication, from the test case generation service, of a generated test case based on the first network information.

Example 14 is the non-transitory computer-readable medium of example(s) 13, wherein executing the API transaction is caused by an execution of a script, the script executing in a context of a webpage.

Example 15 is the non-transitory computer-readable medium of example(s) 13, wherein: the API transaction is a Hypertext Transfer Protocol (HTTP) transaction; the first request message is an HTTP request; the first response message is an HTTP response; and the standardized test information based on the network information is based on the HTTP archive format.

Example 16 is a system comprising: one or more processors; and one or more computer-readable storage media storing instructions which, when executed by the one or more processors, cause the one or more processors to perform operations including: installing a web browser extension for capturing network information; applying a configuration, using a network configuration tool, about a first application programming interface (API) transaction; configuring the web browser extension to execute the first API transaction; executing the first API transaction, wherein the web browser extension captures first network information about the first API transaction comprising first request message information and first response message information; receiving the first network information about the first API transaction; generating standardized test information based on the first network information; outputting the standardized test information to a test case generation service; and receiving an indication, from the test case generation service, of a generated test case based on the first network information.

Example 17 is the system of example(s) 16, wherein outputting the standardized test information to the test case generation service comprises transmitting, to a test case generator, the standardized test information, wherein the standardized test information is in the JavaScript Object Notation (JSON) format.

Example 18 is the system of example(s) 17, wherein receiving the indication, from the test case generation service, of the generated test case based on the first network information comprises receiving, from the test case generator, processed standardized test information comprising, for each API transaction included in the standardized test information, a test case, the test case comprising one or more initial conditions, one or more steps, and one or more expectations.

Example 19 is the system of example(s) 16, further comprising the instructions: transmitting, to the test case generator, an indication to append second network information to the generated test case; and receiving, from the test case generator, a modified test case based on the indication to append second network information to the generated test case.

Example 20 is the system of example(s) 16, wherein the standardized test information further comprises test case configuration information comprising at least one of timeout configurations, retry configurations, or default headers.

That which is claimed is:
1. A method, comprising:
installing a web browser extension for capturing network information;
applying a configuration, using a network configuration tool, about a first application programming interface (API) transaction;
configuring the web browser extension to execute the first API transaction;
executing the first API transaction, wherein the web browser extension captures first network information about the first API transaction comprising first request message information and first response message information;
receiving the first network information about the first API transaction;
generating standardized test information based on the first network information;
outputting the standardized test information to a test case generation service; and receiving an indication, from the test case generation service, of a generated test case based on the first network information.

2. The method of claim 1, wherein executing the API transaction is caused by an interaction with a webpage.

3. The method of claim 2, further comprising receiving one or more images of the webpage during the interaction with the webpage.

4. The method of claim 1, wherein the network configuration tool is a web browser debugging tool, the web browser debugging tool comprising at least a network interaction editor and a filter.

5. The method of claim 1, wherein the standardized test information based on the network information is based on JavaScript Object Notation (JSON).

6. The method of claim 1, further comprising:
configuring the web browser extension to execute a second API transaction;
executing the second API transaction, wherein the web browser extension captures second network information about the second API transaction comprising second request message information and second response message information; and
receiving the second network information about the first API transaction, wherein:
generating the standardized test information is based on the first network information and the second network information;
the generated test case is based on the first network information and the second network information; and
the generated test case is a batch API test comprising a plurality of API transactions.

7. The method of claim 1, further comprising receiving an indication of enablement of capturing network information, wherein the indication is caused by a first interaction with a web browser debugging tool.

8. The method of claim 7, further comprising receiving an indication of a selection of a domain filter, wherein the indication is caused by a second interaction with the web browser debugging tool.

9. The method of claim 1, wherein outputting the standardized test information to the test case generation service comprises transmitting, to the test case generation service, the standardized test information, wherein the standardized test information comprises information about one or more API transactions.

10. The method of claim 9, wherein receiving the indication, from the test case generation service, of the generated test case based on the first network information comprises receiving, from the test case generation service, processed standardized test information comprising, for each API transaction included in the standardized test information, a test case, the test case comprising a test case configuration, one or more steps, and one or more expectations.

11. The method of claim 9, further comprising:
transmitting, to the test case generation service, an indication to modify the generated test case; and
receiving, from the test case generation service, a modified test case based on the indication to modify the generated test case.

12. The method of claim 1, wherein:
the API transaction is a Hypertext Transfer Protocol (HTTP) transaction;
the first request message is an HTTP request; and
the first response message is an HTTP response.

13. A non-transitory computer-readable medium storing instructions that, when executed by one or more processors, cause the one or more processors to perform operations including:
installing a web browser extension for capturing network information;
applying a configuration, using a network configuration tool, about a first application programming interface (API) transaction;
configuring the web browser extension to execute the first API transaction;
executing the first API transaction, wherein the web browser extension captures first network information about the first API transaction comprising first request message information and first response message information;
receiving the first network information about the first API transaction;
generating standardized test information based on the first network information;
outputting the standardized test information to a test case generation service; and
receiving an indication, from the test case generation service, of a generated test case based on the first network information.

14. The non-transitory computer-readable medium of claim 13, wherein executing the API transaction is caused by an execution of a script, the script executing in a context of a webpage.

15. The non-transitory computer-readable medium of claim 13, wherein:
the API transaction is a Hypertext Transfer Protocol (HTTP) transaction;
the first request message is an HTTP request;
the first response message is an HTTP response; and
the standardized test information based on the network information is based on the HTTP archive format.

16. A system comprising:
one or more processors; and
one or more computer-readable storage media storing instructions which, when executed by the one or more processors, cause the one or more processors to perform operations including:
installing a web browser extension for capturing network information;
applying a configuration, using a network configuration tool, about a first application programming interface (API) transaction;
configuring the web browser extension to execute the first API transaction;
executing the first API transaction, wherein the web browser extension captures first network information about the first API transaction comprising first request message information and first response message information;
receiving the first network information about the first API transaction;
generating standardized test information based on the first network information;
outputting the standardized test information to a test case generation service; and
receiving an indication, from the test case generation service, of a generated test case based on the first network information.

17. The system of claim 16, wherein outputting the standardized test information to the test case generation service comprises transmitting, to the test case generation service, the standardized test information, wherein the standardized test information is in the JavaScript Object Notation (JSON) format.

18. The system of claim 17, wherein receiving the indication, from the test case generation service, of the generated test case based on the first network information comprises receiving, from the test case generation service, processed standardized test information comprising, for each API transaction included in the standardized test information, a test case, the test case comprising one or more initial conditions, one or more steps, and one or more expectations.

19. The system of claim 16, further comprising the instructions:
    transmitting, to the test case generation service, an indication to append second network information to the generated test case; and
    receiving, from the test case generation service, a modified test case based on the indication to append second network information to the generated test case.

20. The system of claim 16, wherein the standardized test information further comprises test case configuration information comprising at least one of timeout configurations, retry configurations, or default headers.

* * * * *